US007798902B2

(12) United States Patent
Rasmussen

(10) Patent No.: US 7,798,902 B2
(45) Date of Patent: Sep. 21, 2010

(54) GAMING MACHINE WITH AN IMPROVED TOUCH SCREEN ASSEMBLY

(75) Inventor: James M. Rasmussen, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1490 days.

(21) Appl. No.: 11/159,873

(22) Filed: Jun. 23, 2005

(65) Prior Publication Data

US 2005/0288097 A1 Dec. 29, 2005

Related U.S. Application Data

(60) Provisional application No. 60/583,003, filed on Jun. 25, 2004.

(51) Int. Cl.
*A63F 13/00* (2006.01)

(52) U.S. Cl. .............................. 463/30; 463/31; 463/32; 463/46

(58) Field of Classification Search ................... 463/30, 463/31, 32, 46
See application file for complete search history.

(56) References Cited

U.S. PATENT DOCUMENTS

| | | | | |
|---|---|---|---|---|
| 5,033,744 | A | 7/1991 | Bridgeman et al. | |
| 5,342,047 | A | 8/1994 | Heidel et al. | |
| 5,632,679 | A | 5/1997 | Tremmel | |
| 5,769,716 | A | 6/1998 | Saffari et al. | |
| 5,770,533 | A | 6/1998 | Franchi | |
| 5,796,389 | A | 8/1998 | Bertram et al. | |
| 5,833,537 | A | 11/1998 | Barrie | |
| 5,951,397 | A | 9/1999 | Dickinson | |
| 6,002,582 | A * | 12/1999 | Yeager et al. | 361/679.21 |
| 6,089,976 | A | 7/2000 | Schneider et al. | |
| 6,368,213 | B1 | 4/2002 | McNabola | |
| 6,379,245 | B2 | 4/2002 | DeKeller | |
| 6,419,578 | B1 | 7/2002 | Moody et al. | |
| 6,422,940 | B1 | 7/2002 | Walker et al. | |
| 6,439,995 | B1 | 8/2002 | Hugh-Baird et al. | |
| 6,483,719 | B1 * | 11/2002 | Bachman | 361/816 |
| 6,690,268 | B2 * | 2/2004 | Schofield et al. | 340/438 |
| 6,942,571 | B1 * | 9/2005 | McAllister et al. | 463/20 |
| 2002/0002078 | A1 * | 1/2002 | Jaffe | 463/30 |
| 2002/0191409 | A1 * | 12/2002 | Deline et al. | 362/494 |
| 2003/0109304 | A1 * | 6/2003 | Gauselmann | 463/30 |
| 2004/0162146 | A1 * | 8/2004 | Ooto | 463/46 |

FOREIGN PATENT DOCUMENTS

| | | |
|---|---|---|
| EP | 0769679 | 4/1997 |
| EP | 1083531 | 4/1997 |

(Continued)

*Primary Examiner*—James S McClellan
*Assistant Examiner*—Brandon Gray
(74) *Attorney, Agent, or Firm*—Nixon Peabody LLP

(57) ABSTRACT

A gaming machine controlled by a processor in response to a wager comprises a main display, a secondary display, and a touch screen assembly overlying the secondary display. The secondary display touch screen assembly has an inner bezel frame, an insulated touch screen, a panel having an opening, and an outer bezel frame. The insulated touch screen ha an insulating material around a periphery of the touch screen. The insulated touch screen is positioned within the opening of the panel. The panel and the insulated touch screen are positioned between the inner bezel frame and the outer bezel frame.

18 Claims, 3 Drawing Sheets

FOREIGN PATENT DOCUMENTS

| | | |
|---|---|---|
| EP | 0 789 338 | 8/1997 |
| EP | 0 886 250 | 12/1998 |
| EP | 1 025 886 | 8/2000 |
| GB | 2 251 112 A | 6/1992 |
| WO | WO 97/27570 | 7/1997 |
| WO | WO 98/00207 | 1/1998 |

* cited by examiner

GAMING MACHINE WITH AN IMPROVED TOUCH SCREEN ASSEMBLY

CROSS-REFERENCE TO RELATED APPLICATIONS

This application claims the benefit of priority of U.S. Provisional Patent Application No. 60/583,003, filed Jun. 25, 2004, which is hereby incorporated by reference in its entirety.

FIELD OF THE INVENTION

The present invention relates generally to gaming machines and, more particularly, to a gaming machine with an improved touch screen assembly.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available, because such machines attract frequent play and, hence, increase profitability to the operator. Many gaming machines possess two displays, a main display and a secondary display. In these gaming machines it is not atypical for the main display to be a touch screen video display including a video display overlapped by a similarly sized touch screen. The touch screen is typically adhered or taped to a front panel of the main display. The touch screen allows players to determine and easily select game options during play. The main display provides useable game play space typically segregated into first and second portions. The first portion is dedicated to dynamic game features such as dynamic graphics and animations. The second portion is dedicated to static game features such as player-selectable indicia and text boxes.

As game designers increase the complexity of games, they are constrained by the amount of useable game play space afforded by the main display. For example, the larger the second portion of the video display dedicated to fairly static game features, the smaller the available first portion for presenting dynamic game features. Similarly, the larger the first portion of the main display dedicated to dynamic game features, the smaller the available second portion for presenting static game features.

In existing machines, the secondary display is often used for static game features such as a pay table or other static features designed to help attract players to a particular gaming machine. Recently, the secondary display has been used for secondary games. To create the most entertaining and exciting gaming machine, there exists a need for a gaming machine with a secondary display arrangement that facilitates presentation of both dynamic and static game features without compromising the ability to present one at the expense of the other.

SUMMARY OF THE INVENTION

Briefly, in accordance with the foregoing, a gaming machine is controlled by a processor in response to a wager and comprises a main display, a secondary display, and a touch screen assembly overlying the secondary display. The touch screen assembly has an inner bezel frame, an insulated touch screen, a panel having an opening, and an outer bezel frame. The insulated touch screen has an insulating material around a periphery of the touch screen. The insulated touch screen is positioned within the opening of the panel. The panel and the insulated touch screen are positioned between the inner bezel frame and the outer bezel frame.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENT

Figure 1:
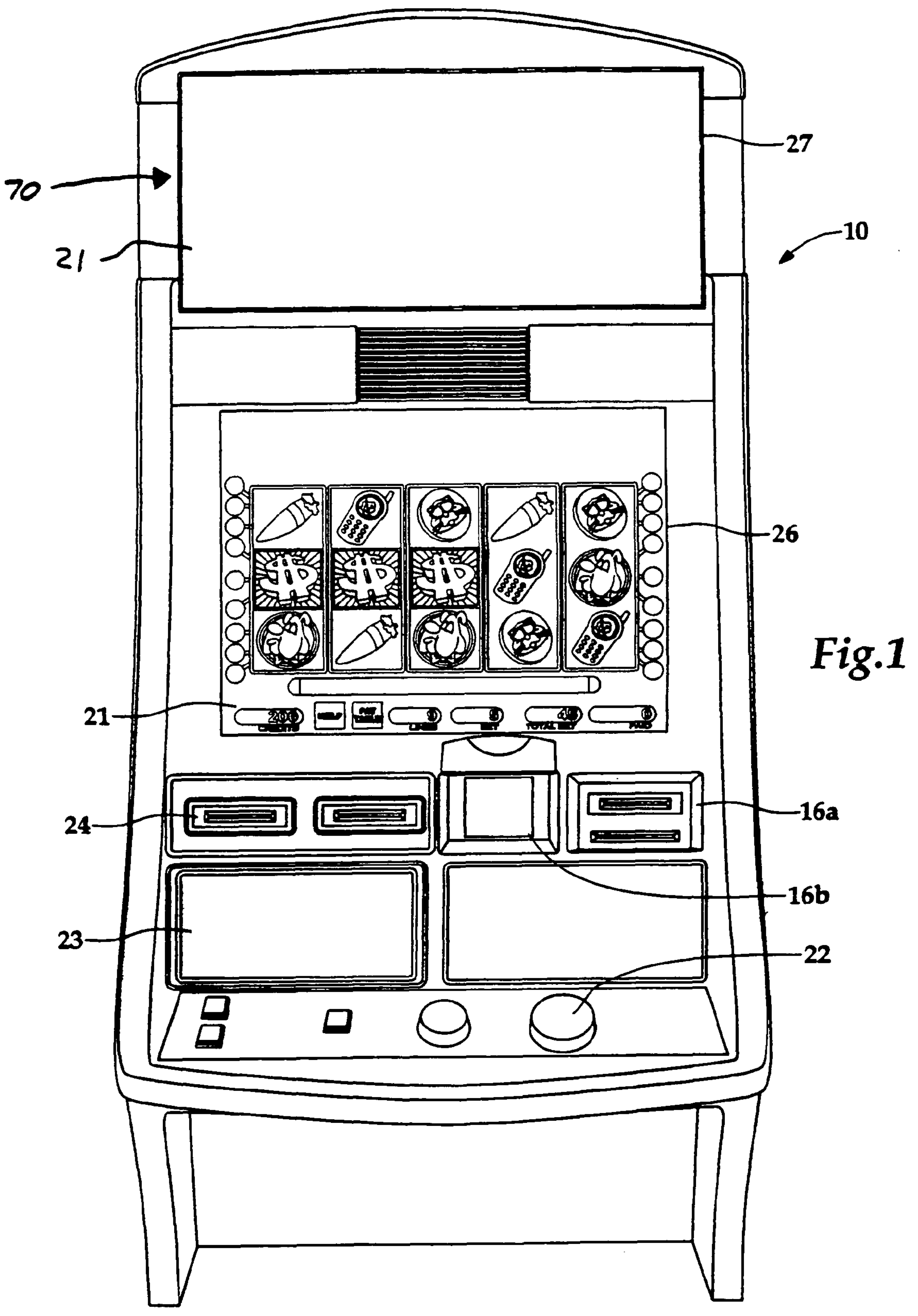
FIG. 1 is a front view of an upright video gaming machine according to one embodiment of the present invention.

The present application relates to a gaming machine 10 with an improved touch screen assembly that is controlled by a computer microprocessor. Turning now to the drawings and referring initially to FIG. 1, there is shown a front view of a typical gaming machine 10 used by gaming establishments, such as casinos. As shown, the gaming machine 10 includes input devices, such as a wager acceptor 16 (shown as a card wager acceptor **16*a* and a cash wager accepter 16*b*), touch screens 21 a push-button panel 22, and an information reader 24. For outputs, the gaming machine 10 includes a payout mechanism 23, a main display 26 for displaying information about the basic wagering game, and a secondary display 27 that may display an electronic version of a pay table, and/or also possibly game-related information or other entertainment features. While these typical components found in the gaming machine 10** are described below, it should be understood that numerous other elements may exist and may be used in any number of combinations to create various forms of a gaming machine.

The wager acceptor 16 may be provided in many forms, individually or in combination. The cash wager acceptor **16*a* may include a coin slot acceptor or a note acceptor to input value to the gaming machine 10. The card wager acceptor 16*b* may include a card-reading device for reading a card that has a recorded monetary value with which it is associated. The card wager acceptor 16*b* may also receive a card that authorizes access to a central account, which can transfer money to the gaming machine 10**.

Also included is the payout mechanism 23, which performs the reverse functions of the wager acceptor. For example, the payout mechanism 23 may include a coin dispenser or a note dispenser to output value from gaming machine 10. Also, the payout mechanism 23 may also be adapted to receive a card that authorizes the gaming machine to transfer credits from the gaming machine 10 to a central account.

The push button panel 22 is typically offered, in addition to the touch screens 21, to provide players with an option on how to make their game selections. Alternatively, the push button panel 22 provides inputs for one aspect of operating the game, while the touch screens 21 allow for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of display device suitable for use in the gaming machine 10. As shown, the main display 26 includes the touch screen 21 overlaying the entire display (or a portion thereof) to allow players to make game-related selections. Alternatively, the gaming machine 10 may have a number of mechanical reels to display the game outcome, as well. Also shown, the secondary display 27 features a touch screen assembly 70, as will be described in further detail in connection with FIGS. 3 and 4. The touch screen assembly 70 also allows players to make game-related selections.

Figure 2:
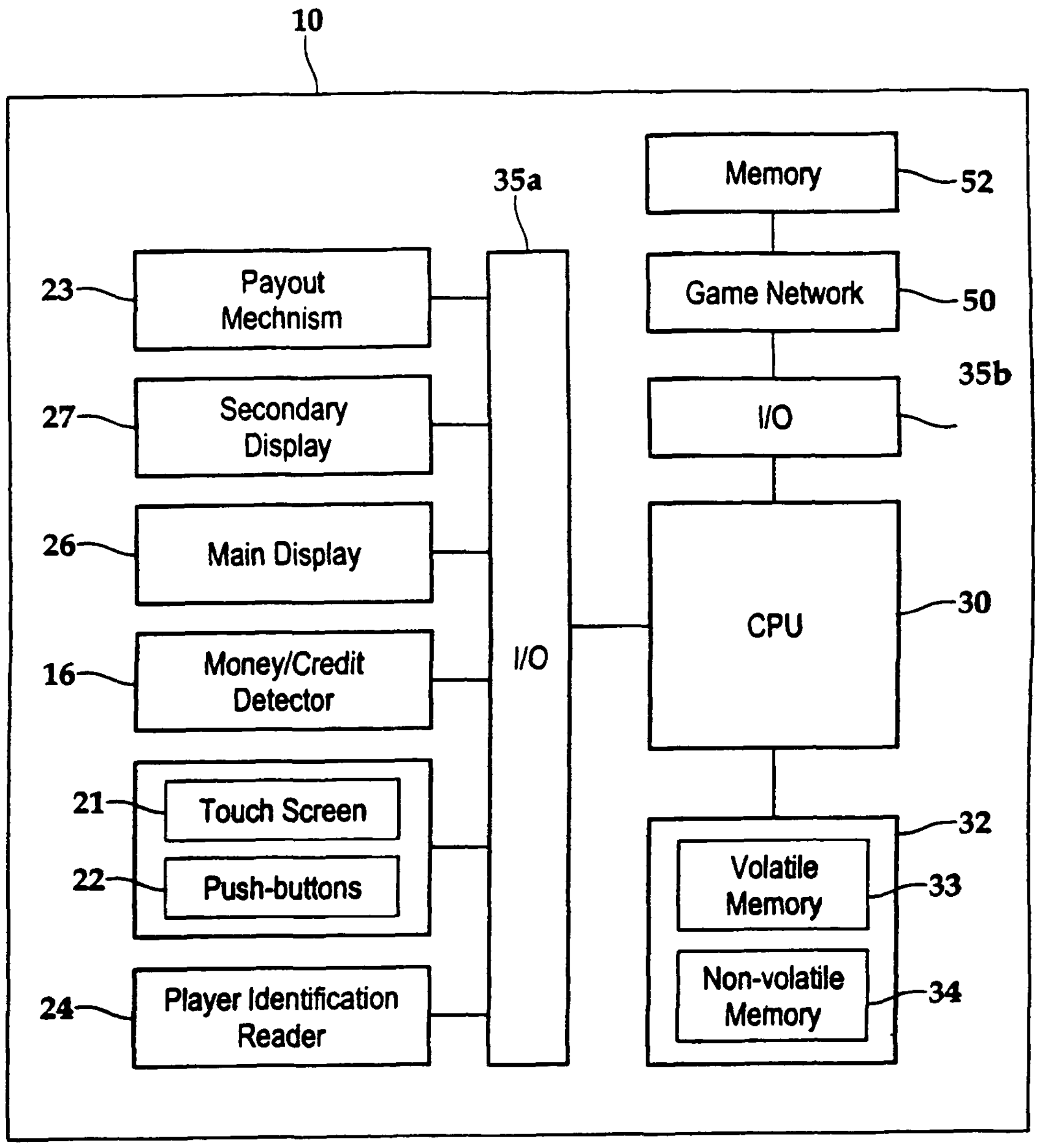
FIG. 2 is a block diagram of the video gaming machine of FIG. 1

As shown in FIG. 2, the various components of the gaming machine 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming machine 10 and the CPU 30 occur through input/output (I/O) circuits 35*a*. As such, the CPU 30 also controls and receives inputs from the peripheral components of the gaming machine 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming machine 10. Instead, the CPU 30 may be part of a game network 50 (FIG. 2) and may be used to control numerous gaming machines 10. In these embodiments, the CPU 30 will run the basic games for each of the gaming machines 10, and may also be used to link the gaming machines 10 together. The game network 50 can include progressive jackpots that are contributed to by all or some of the gaming machines 10 in the network (e.g., machine-level jackpots that only each machine 10 contributes to, bank-level jackpots that are contributed to by all of the machines 10 in a particular bank, and wide-area jackpots that are contributed to by a larger number of machines 10, such as multiple banks). Alternatively, the game network 50 can allow the player to retrieve assets obtained while playing one machine 10 at a different gaming machine that is also part of the game network. Assets may be any number of things, including, but not limited to, monetary or non-monetary awards, features that a player builds up in a bonus or progressive game to win awards, etc.

Figure 3:
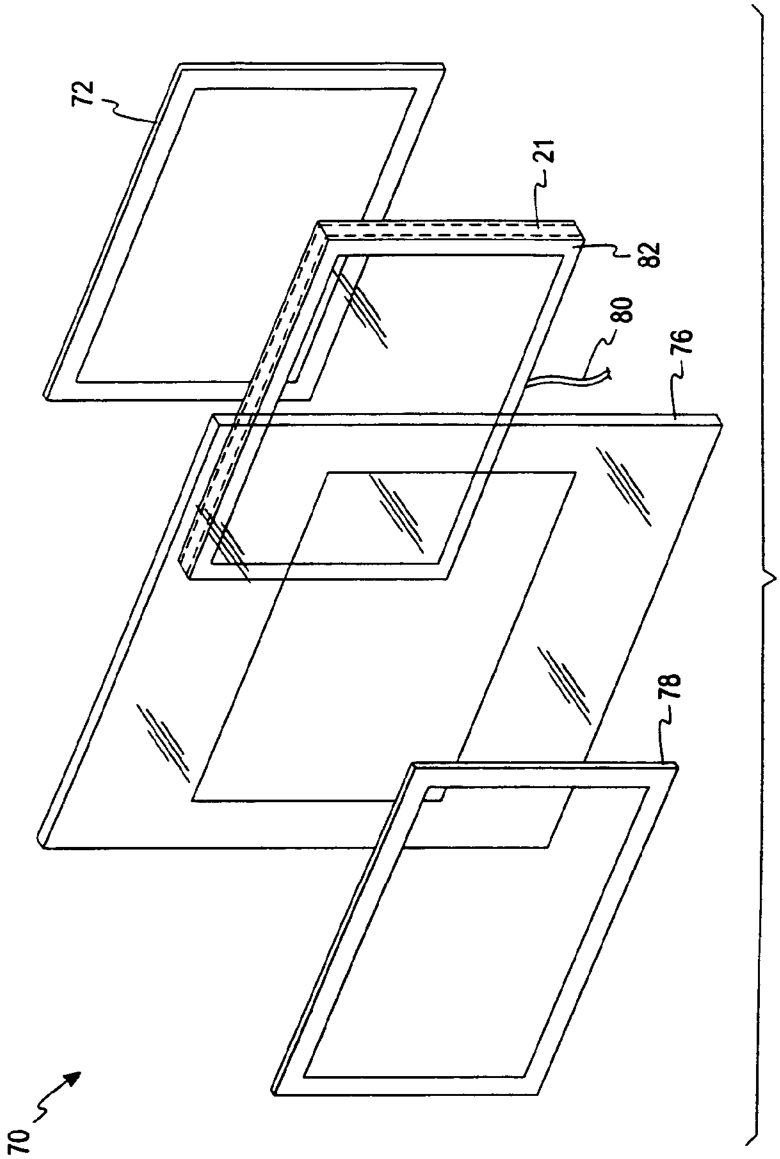
FIG. 3 is an exploded view of a secondary display touch screen assembly according to one embodiment of the present invention.
Figure 4:
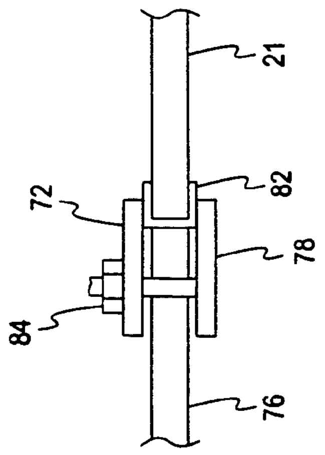
FIG. 4 is a partial cross-sectional view of a secondary display touch screen assembly according to one embodiment of the present invention.

Referring now to FIG. 3, an exploded view of the touch screen assembly 70 for the secondary display 27 is shown according to one embodiment of the present invention. The touch screen assembly 70 comprises an inner bezel frame 72, a touch screen 21, a panel 76, an outer bezel frame 78, a pigtail 80, insulation 82, and at least one fastener 84 (FIG. 4). The touch screen 21 resides within an opening of the panel 76. The panel 76 typically is made of glass, however it is contemplated that the panel 76 may be made of acrylic or other polymeric material. The inner bezel frame 72 and the outer bezel frame 78 secure the touch screen 21 within the panel 76. The inner and outer bezel frames 72, 78 may be produced from a variety of metallic materials or polymeric materials. The bezel frames 72, 78 simply serve to structurally secure the touch screen assembly 70 components. The pigtail 80 transmits signals from the touch screen 21 so that the CPU 30 of the gaming machine 10 may process the user contacting a portion of the touch screen 21. The insulation 82 may be comprised of any material that is non-conductive. Some non-limiting examples of materials for the insulation 82 include ABS plastic, Urethane, Rubber, and any other moldable non-conductive material. The insulation 82 isolates the periphery of the touch screen 21 approximately ⅛ inch from any conductive material located within the gaming machine 10. The touch screen assembly 70 is a liquid-tight assembly. The at least one fastener 84 secures the inner bezel frame 72 to the outer bezel frame 78.

Turning next to FIG. 4, a partial cross-section of the touch screen assembly 70 is shown. The touch screen 21, the panel 76, and the insulation 82 are secured between the inner bezel frame 72 and the outer bezel frame 78. FIG. 4 also shows the how the insulation 82 insulates the touch screen 21 from metallic components located within ⅛ inch of the periphery of the touch screen 21. The insulation 82 provides both a water tight seal for the touch screen assembly 70 and electrically insulates the touch screen 72 from metallic components. The touch screen assembly 70 provides better reliability for the gaming machine 10 based on the electrical insulation of the touch screen 21. The fact that the touch screen assembly 70 is liquid-tight also helps to ensure the reliability of the gaming machine 10. The touch screen assembly 70 also reduces the amount of maintenance that the gaming machine 10 is likely to need, since it electrically insulates the touch screen 21 and is liquid-tight.

According to an alternate embodiment of the present invention it is contemplated that a separate insulation material may not be a necessary component of the touch screen assembly. In this embodiment of the present invention the touch screen assembly comprises an inner bezel frame, a touch screen, a panel, an outer bezel frame, and at least one fastener. The touch screen resides within an opening of the panel. The inner bezel frame and the outer bezel frame secure the touch screen within the panel. According to this embodiment, the inner bezel frame and the outer bezel frame comprise non-conductive materials such as a polymeric material. Additionally the panel in this embodiment also is non-conductive. Therefore, a separate insulation surrounding the touch screen is not required to electrically insulate the touch screen. This embodiment would resemble the embodiment depicted in FIGS. 3 and 4 except that the insulation 82 is removed. It is contemplated that this embodiment may further comprise a seal to assist in making the touch screen assembly liquid-tight, however this seal is not required.

According to another alternate embodiment of the present invention it is contemplated that only an outer bezel frame is part of the touch screen assembly. The touch screen assembly of this embodiment comprises a touch screen, a panel, and an outer bezel frame. The touch screen overlays the panel. The outer bezel frame secures the touch screen to the panel. In this embodiment the touch screen may have insulation around the periphery of the touch screen, similar to that depicted in FIGS. 3 and 4. Since the touch screen overlays the panel an inner bezel frame is not needed to secure the touch screen assembly.

According to a further alternate embodiment of the present invention it is contemplated that only an inner bezel frame is part of the touch screen assembly. The touch screen assembly of this embodiment comprises a touch screen, a panel with an opening, and an inner bezel frame. The touch screen is located behind the panel with an opening. The inner bezel frame secures the touch screen to the panel. In this embodiment the touch screen may have insulation around the periphery of the touch screen, similar to that depicted in FIGS. 3 and 4. Since the touch screen is located behind the panel with an opening an outer bezel frame is not needed to secure the touch screen assembly.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A gaming machine controlled by a processor in response to a wager, the gaming machine comprising:

a main display;

a secondary display; and a touch screen assembly overlying at least one of the main display and the secondary display, the touch screen assembly having an inner bezel frame, an insulated touch screen, a panel having an opening, and an outer bezel frame, the insulated touch screen having an insulating material around a periphery of the touch screen, the insulated touch screen being positioned within the opening of the panel, the panel and the insulted touch screen being positioned between the inner bezel frame and the outer bezel frame, the insulating material separating the inner bezel frame, the outer bezel frame, the insulated touch screen, and the panel from each other.

2. The gaming machine of claim 1, wherein the insulating material is sandwiched between the insulated touch screen and panel thereby creating a liquid-tight seal.

3. The gaming machine of claim 1, wherein the insulating material around the periphery of the touch screen provides an electrical barrier of about ⅛ inch thick from any conducting material to the touch screen.

4. The gaming machine of claim 1, wherein the touch screen assembly further comprises at least one fastener configured to secure the inner bezel frame to the outer bezel frame.

5. The gaming machine of claim 1, wherein the insulating material comprises at least one of ABS plastic, urethane, and a moldable polymeric material.

6. The gaming machine of claim 1, wherein the insulating material extends continuously around the periphery of the insulated touch screen.

7. The gaming machine of claim 1, wherein the insulating material is interposed between the insulated touch screen and the inner and outer bezel frames.

8. The gaming machine of claim 1, wherein the inner bezel frame and the outer bezel frame secure the insulated touch screen inside the panel opening.

9. The gaming machine of claim 1, wherein the inner bezel frame and the outer bezel frame each comprise at least one of a polymeric material and metal.

10. A gaming system controlled by a processor to conduct a wagering game in response to a wager, the gaming system comprising:

a first display;

a second display; and a touch screen assembly overlying at least a portion of at least one of the first and second displays, the touch screen assembly being configured to receive inputs from a player, the touch screen assembly including a touch screen with an insulating material positioned around a periphery of the touch screen, the insulating material inhibiting electrical contact with the touch screen, the touch screen being secured by first and second opposing bezel frames inside an opening defined by a panel, the insulating material separating the first bezel frame, the second bezel frame, the touch screen, and the panel from each other.

11. A touch screen assembly comprising:

a touch screen configured to receive inputs from a player;

an inner bezel frame;

an outer bezel frame;

a panel with an opening, the touch screen being positioned within the opening of the panel, the panel and the touch screen being positioned between the inner and outer bezel frames; and an insulating material extending continuously around a periphery of the touch screen, the insulating material inhibiting electrical contact with the touch screen, the insulating material separating the inner bezel frame, the outer bezel frame, the touch screen, and the panel from each other.

12. The touch screen assembly of claim 11, wherein the insulating material comprises at least one of ABS plastic, urethane, and a moldable polymeric material.

13. The touch screen assembly of claim 12, wherein the the inner bezel frame and the outer bezel cooperatively secure the insulated touch screen within the panel opening.

14. A gaming machine controlled by a processor, the gaming machine comprising:

at least one display; and a touch screen assembly overlying at least a portion of the at least one display, the touch screen assembly having a touch screen configured to receive inputs from a player, an insulating material extending continuously around a periphery of the touch screen, a panel having an opening, an outer bezel frame, and an inner bezel frame, the inner bezel frame securing the touch screen to the panel, the insulating material separating the inner bezel frame, the outer bezel frame, the touch screen, and the panel from each other.

15. The gaming machine of claim 14, wherein the insulting material extends inwardly from the periphery of the touch screen creating an electrical barrier between the touch screen and the panel.

16. The gaming machine of claim 15, wherein the insulating material comprises at least one of ABS plastic, urethane, and a moldable polymeric material.

17. The gaming machine of claim 15, wherein the insulating material spaces the touch screen from the panel.

18. The gaming machine of claim 15, wherein the insulating material is sandwiched between the touch screen and panel thereby creating a liquid-tight seal therebetween.

* * * * *

UNITED STATES PATENT AND TRADEMARK OFFICE

CERTIFICATE OF CORRECTION

PATENT NO. : 7,798,902 B2
APPLICATION NO. : 11/159873
DATED : September 21, 2010
INVENTOR(S) : James M. Rasmussen It is certified that error appears in the above-identified patent and that said Letters Patent is hereby corrected as shown below:

-- On the title page, item (57), in the Abstract, line six, please delete the word “ha” and replace with --has--

-- Claim 13, Column 6, Line 36
Please delete the duplicate word “the”

Signed and Sealed this
Eighth Day of November, 2011

David J. Kappos
*Director of the United States Patent and Trademark Office*